United States Patent
Kong et al.

(10) Patent No.: US 7,680,177 B2
(45) Date of Patent: Mar. 16, 2010

(54) ADAPTIVE UNBIASED LEAST SQUARE (LS) ALGORITHM FOR MITIGATING INTERFERENCE FOR CDMA DOWN LINK AND OTHER APPLICATIONS

(75) Inventors: Ning Kong, La Jolla, CA (US); Francis Swarts, San Diego, CA (US); Michiel Petrus Lotter, San Diego, CA (US); Nelson R. Sollenberger, Farmingdale, NJ (US); Mark Kent, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 702 days.

(21) Appl. No.: 11/510,398

(22) Filed: Aug. 25, 2006

(65) Prior Publication Data

US 2007/0211685 A1 Sep. 13, 2007

Related U.S. Application Data

(60) Provisional application No. 60/782,074, filed on Mar. 13, 2006.

(51) Int. Cl.
  *H04B 1/707* (2006.01)
  *H04B 7/02* (2006.01)
  *H04L 1/00* (2006.01)

(52) U.S. Cl. .................. 375/148; 375/267; 375/348
(58) Field of Classification Search .............. 375/147, 375/148, 150, 260, 267, 348
See application file for complete search history.

(56) References Cited

U.S. PATENT DOCUMENTS

| | | | | |
|---|---|---|---|---|
| 2005/0070323 | A1* | 3/2005 | Lozano et al. | 455/522 |
| 2006/0029146 | A1* | 2/2006 | Catreux et al. | 375/267 |
| 2006/0088006 | A1* | 4/2006 | Chimitt | 370/332 |
| 2007/0076791 | A1* | 4/2007 | DiFazio et al. | 375/229 |

* cited by examiner

*Primary Examiner*—Don N Vo
(74) *Attorney, Agent, or Firm*—Garlick Harrison & Markison; Bruce E. Garlick

(57) ABSTRACT

A multipath wireless communication is processed to recover a transmitted data signal without performing a direct matrix inversion (DMI). First, the multipath wireless communication is received. Then $H^H H$ and $HH^H$ values associated with the multipath wireless communication are determined. Weights based on $H^H H$ and $HH^H$ associated with the received data signal may then be determined and used to recover the transmitted data signal from the received multipath wireless communication.

25 Claims, 8 Drawing Sheets

ADAPTIVE UNBIASED LEAST SQUARE (LS) ALGORITHM FOR MITIGATING INTERFERENCE FOR CDMA DOWN LINK AND OTHER APPLICATIONS

CROSS REFERENCE TO RELATED APPLICATIONS

This application claims the benefit of priority to and incorporates herein by reference in its entirety for all purposes, U.S. Provisional Patent Application No. 60/782,074 entitled "AN ADAPTIVE UNBIASED LEAST SQUARE (LS) ALGORITHM FOR MITIGATING INTERFERENCE FOR CDMA DOWN LINK AND OTHER APPLICATIONS," by Ning Kong, et al. filed on Mar. 13, 2006.

TECHNICAL FIELD OF THE INVENTION

The present invention relates generally to techniques used to mitigate inter-symbol interference (ISI) or inter-chip interference (ICI), and more particularly, it provides a system and method that employs an adaptive least square (LS) algorithm for mitigating interference for CDMA down link and other applications.

BACKGROUND OF THE INVENTION

Communication systems are known to support wireless and wire lined communications between wireless and/or wire lined communication devices. Such communication systems range from national and/or international cellular telephone systems, to the Internet, and to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Direct or indirect communications may experience be received via multiple pathways. Multiple pathways often result in the deflection of a wireless communications signals off obstacles that can cause interference during reception. Multipath fading occurs when a wireless communications signal is received by an antenna and later the same signal is received again, reflected from an obstacle. This can result from both retransmission and different transmission paths. Under certain conditions, two or more of the signals can interfere with each other and create "fading" (a loss of signal) in the communications link. Fading may occur when signals are retransmitted or received by multiple antennas. Thus, multipath fading may be observed within both wireless and wire-line communications. As the amount of data contained within wireless and wire-line communications increase and the power of the transmitted signal is reduced, the techniques chosen to combat the multipath fading can vary.

Previously, least mean square (LMS) algorithms have been employed to avoid matrix inversion when trying to find the optimum solution to mitigate inter-symbol interference (ISI) or inter-chip interference (ICI). On CDMA downlink, there is strong ICI due to multipaths. To date, adaptive LMS algorithms have been applied to reduce ICI without multipath channel matrix inversion. However, this method produces a biased signal which is not desirable.

Further limitations and disadvantages of conventional and traditional matrix inversion processes or processes used to avoid matrix inversion will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1A:
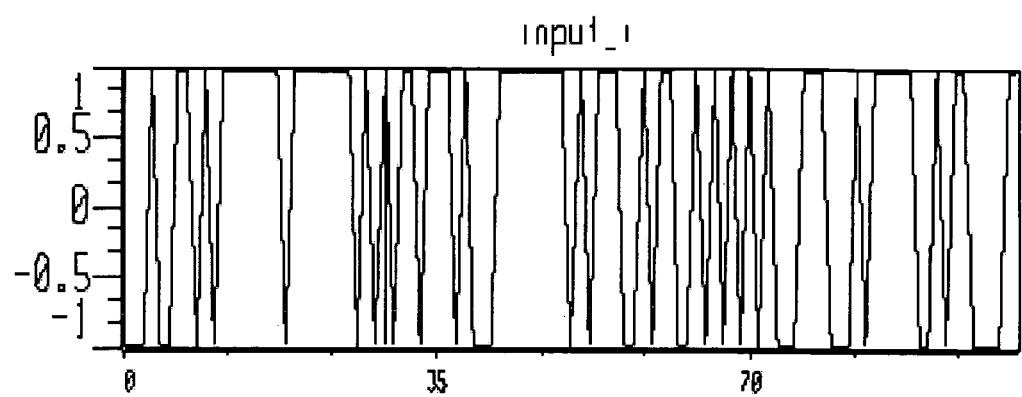
FIGS. 1A through 1E provide performance comparison among three algorithms with a heavily decayed multipath profile and no noise.

Embodiments of the present invention are illustrated in the FIGS., like numerals being used to refer to like and corresponding parts of the various drawings.

In signal processing, the minimum variance unbiased estimation, best linear unbiased estimation and least square estimation, all require matrix inversion. If the environments do not change, the inversion only needs to be done only. However, when the environment is changing, the inverted matrix needs to be repeatedly inverted in order to take account for the changing environment. Ideally, the update rate should be the same as the rate of change within the environment. Consequently, the complexity of the estimation increases due to the fact that the matrix inversion needs to be repeatedly calculated more often.

For CDMA down link, the transmitted multi-user signal, denoted by x and received signal, denoted by y, after multipath (MP) channel is related as $$y = Hx + n \qquad \text{eq. (1)}$$

where H is the channel matrix. Its (i,j) element is defined as follows if we ignore the very beginning filling up and the very end emptying the MP channels $$h_{ij} = \begin{cases} h_{d_{max}+i-j}, & \text{if } -d_{max} \le i-j \le 0 \\ 0, & \text{otherwise} \end{cases}$$

where h is the MP channel impulse response and $h = (h_0\ h_1\ \ldots\ h_{d_{max}})^T$, n is the Gaussian noise which is independent of the transmitted signal and has the power of $\sigma^2$. Based on the structure of the H. It is clear that the size of the H is n×m where m is the size of the input, n is the size of the output and $m = n + d_{max}$. To elaborate, let's give an example of 5 input chips and 3 output chips with $d_{max} = 2$ $$y = \begin{pmatrix} y_0 \\ y_1 \\ y_2 \end{pmatrix} = Hx = \begin{pmatrix} h_2 & h_1 & h_0 & & \\ & h_2 & h_1 & h_0 & \\ & & h_2 & h_1 & h_0 \end{pmatrix} \begin{pmatrix} x_0 \\ x_1 \\ x_2 \\ x_3 \\ x_4 \end{pmatrix}$$

If one uses the optimum Wiener solution in the minimum mean squared error (MMSE) sense to recover x, then the weights, denoted by w, is obtained as $$w_{Bmmse} = (HH^H + \sigma^2 I)^{-1} h_1 \qquad \text{eq. (2)}$$

Where $H^H$ is the transpose conjugate of H, $h_1$ is one column vector in H and it only decides the estimation delay. As shown in Eq. (2), the matrix of n-by-n inversion is need and the inversion needs to update as soon as the channel varies. And the best estimator is the Bayesian MMSE (minimum mean square estimator), denoted by $\hat{x}_{Bmmse}$ is $$\hat{x}_{Bmmse} = w_{Bmmse}^H y = h_1^H (HH^H + \sigma^2 I)^{-1} y$$

Sometimes, when the signal is transmitted block by block, the received signal is related to the transmitted signal through channel as the following $$y = Hx + n$$

but H (the channel matrix) is different from that in Eq.(1). Its (i,j) element is now defined as $$h_{ij} = \begin{cases} h_{i-j}, & \text{if } 0 \le i-j \le d_{max} \\ 0, & \text{otherwise} \end{cases}$$

For example, when L=2, $$y = \begin{pmatrix} y_0 \\ y_1 \\ y_2 \\ y_3 \\ y_4 \end{pmatrix} = Hx + n = \begin{pmatrix} h_0 & & \\ h_1 & h_0 & \\ h_2 & h_1 & h_0 \\ 0 & h_2 & h_1 \\ 0 & 0 & h_2 \end{pmatrix} \begin{pmatrix} x_0 \\ x_1 \\ x_2 \end{pmatrix} + n \qquad \text{eq. (3)}$$

Where $(x_0\ x_1\ x_2)^T$ is the transmitted signal vector, n is additive white gaussian noise (AWGN), $(y_0\ y_1\ y_2\ y_3\ y_4)^T$ is received signal and $(h_0\ h_1\ \ldots\ h_{L-1})$ is the channel L taps, here L is two. The size of y, denoted by n is related to the size of x, denoted by m, as n=L+m−1. It is known [1] that the best estimator of $$\begin{pmatrix} x_0 \\ x_1 \\ x_2 \end{pmatrix},$$

which is the minimum variance unbiased estimator (MVUE) is denoted by $\hat{x}_{Bmmse}$, is given as the following:

$$\hat{x}_{mvu} = (H^H H)^{-1} H^H y$$

And the optimum MVUE weight is $$\hat{w}_{mvu} = H(H^H H)^{-1} e_1 \qquad \text{eq. (4)}$$

Where $e_1$ a column vector with the 1th element being one and the rest of them is zero. Note that since the channel is time varying, the matrix inversion $(H^H H)^{-1}$ needs to be calculated constantly.

There are many iterative methods to deal with matrix inversion. For example, the Jacobi method, the Gauss-Seidel iteration method and successive over-relaxation method are such methods. However, these methods are oriented to solve the linear equations of y=Ax without performing the inverse of A by iteratively calculating x. Embodiments of the present invention differ by iteratively calculating the inverse of A.

Embodiments of the present invention provide an iterative and adaptive method with which to avoid the matrix inversion. To avoid the matrix inversion and constant inversion to reflect the channel changes, one can combine the matrix inversion and its update in one task to be performed without an actual inversion. To elaborate, obtain $A^{-1}$ denoted by inv_A, where A is positive definite, following recursive calculation without actual inversion need only to be performed:

$$\text{inv}\_A^{(i)} = [I - \mu A] \times \text{inv}\_A^{(i-1)} + \mu I \qquad \text{eq. (5)}$$

Where $$\text{inv}\_A^{(i)} = \begin{cases} 0, & i < 0 \\ I, & i > 0 \end{cases}$$

where I is the identity matrix, $$\mu = 2 \bigg/ \sum_{i=1}^{L} |a_{ii}|^2$$

is the step size. Then it can be easily proven that at the nth iteration, $$\text{inv}\_A^{(i)} = \mu \sum_{j=0}^{n} [I - \mu A]^j.$$

Then, when $i \to \infty$, $$\lim_{i \to \infty} \text{inv}\_A^{(i)} = \lim_{i \to \infty} \mu \sum_{j=0}^{i} [I - \mu A]^j = \mu[\mu A]^{-1} = A^{-1} \quad \text{eq. (6)}$$

Note that from eq.(5), during the process of iteration, the new A is incorporated in the calculation of inv_$A^{(i)}$, hence the inversion and its update are achieved simultaneously.

The following discussion provides a proof for this method. Since A is positive definite, A has n positive eigenvalues, denoted by $\lambda_k$, k=1, ... n, and let A=U$\Lambda U^H$, where U is a unitary matrix and its column vectors are the eigenvectors of the A. Then $$\text{inv}\_A^{(i)} = [I - \mu U \Lambda U^H] \times \text{inv}\_A^{(i-1)} + \mu I \text{ or}$$

$$\text{inv}\_A^{(i)} = [U - \mu U \Lambda] U^H \text{inv}\_A^{(i-1)} + \mu I = U[I - \mu \Lambda] U^H \cdot \text{inv}\_A^{(i-1)} + \mu I$$

$$U^H \text{inv}\_A^{(i)} = [I - \mu \Lambda] U^H \text{inv}\_A^{(i-1)} + \mu U^H$$

$$\text{inv}\_A_1^{(i)} = [I - \mu \Lambda] \times \text{inv}\_A_1^{(i-1)} + \mu U^H \quad \text{eq. (8)}$$

where inv_$A_1^{(i)}$=$U^H$inv_$A^{(i)}$. Therefore, when $|1-\mu\lambda_k|<1$, k=1, ..., m, or $$0 < \mu < \frac{2}{\lambda_{max}} (3 \cdot 2 \cdot 1)$$

converges to the following:

$$\text{inv}\_A_1^{(i)} = \sum_{j=0}^{i} [I - \mu(\Lambda)]^j \mu U^H$$

when $i \to \infty$, $$\lim_{i \to \infty} \text{inv}\_A_1^{(i)} = \lim_{i \to \infty} \mu \sum_{j=0}^{i} [I - \mu(\Lambda)]^j \mu U^H$$

$$= [\mu \Lambda]^{-1} \mu U^H$$

$$= \Lambda^{-1} U^H$$

$$= (U^H A U)^{-1} U^H$$

$$= U^H A^{-1}$$

$$= \lim_{i \to \infty} U^H \text{inv}\_A^{(i)}$$

Therefore, $\lim_{i \to \infty}$inv_$A^{(i)}$=$A^{-1}$. One can easily prove that the converse is also true.

Based on the above proof, both the BMMSE weights in Eq. (2) and MVUE weights in Eq.(4) can be obtained without actual inversion and in an updated way so that it incorporates the most recent information.

$$w_{Bmmse}^{(i)} = (I - \mu H H^H - \mu \sigma^2 I) w_{Bmmse}^{(i-1)} + \mu h_1 \quad \text{eq. (7)}$$

And $$\begin{cases} w_{mvue\_temp}^{(i)} = (I - \mu H^H H) w_{mvue\_temp}^{(i-1)} + \mu e_l \\ w_{mvue}^{(i)} = H w_{mvue\_temp}^{(i)} \end{cases} \quad \text{eq. (8)}$$

One can easily verify based on the above discussion that $w_{Bmmse}^{(\infty)}$=$(HH^H+\sigma^2 I)^{-1}h_1$ or $w_{Bmmse}^{(\infty)H}$=$h_1^H(HH^H+\sigma^2 I)^{-1}$ which is the same as in Eq.(2). $w_{mvue}^{(\infty)}$=$H(H^H H)^{-1}e_1$ which is exactly the same as (4).

Within the methods provided by embodiments of the present invention, one is not required to calculate the inverse of $\hat{x}_{mvu}$=$(H^H H)^{-1}H^H y$ (2) and $\hat{x}_{Bmmse}$=$H^H(HH^H+\sigma^2 I)^{-1}y$ (4), but instead one is required to calculate $HH^H$ (7) and $H^H H$ (8). Fortunately, the complexity of both $H^H H$ and $HH^H$ are low due to the special structure of H as shown in (1) or (2). For example, the matrix size of $H^H H$ is decided by the size of the input (to the equalizer) signal which is much larger than the number of the multipaths (or the number of channel taps L as described earlier) in the channel, but the complexity of $H^H H$ decided by only the size of L. Since there are only L different elements in $H^H H$ and actually $H^H H$ is a symmetrical Toeplitz matrix. The L distinct elements are calculated in the following way:

$$(HH^H)_{ij} = (HH^H)_{i-j} = (HH^H)_k = \sum_{\substack{i-j=k \\ i,j=0}}^{L-1} h_i h_j \quad \text{eq. (10)}$$

One should additionally note in equation (10) that the number of the multiplications decreases as k increases. The total number of the multiplications required is given by the expression:

$$\sum_{k=0}^{L-1} (L-K) = \sum_{k'=L}^{1} h' = \sum_{k=1}^{L} k = \frac{L(L+1)}{2} \approx \frac{L^2}{2} \quad \text{eq. (11)}$$

This number of required multiplications is less than the number required for direct matrix inversion (DMI) in (2) or (4). In DMI, the number of multiplications is on the order of the matrix size cubed. With the efficient Levinson algorithm, the number is reduced to the square of the size of the matrix. However, this number is still much larger than the square of the number of the mulitpaths. In addition, in DMI, before inversion, both $H^H H$ and $HH^H$ need to be calculated first anyway.

Besides the lower complexity provided by the non-inversion method provided by embodiments of the present invention and explained in the previous section. Embodiments of the present invention have the following additional advantage. Due to the high complexity of DMI, the required inversions cannot not be performed as often as needed when H in equations (2) and (4) are constantly changing. This inability will result in some performance loss since the H being used is already out of date. In the iterative/adaptive method provided by embodiments of the present invention, H is constantly updated at the iteration rate which is faster than the DMI update rate. For example, in CDMA downlink or other like situations, a new H is available every chip, but DMI cannot be performed at the chip rate. However, non-inversion method provided by embodiments of the present invention may be performed at the chip rate.

Figure 1B:
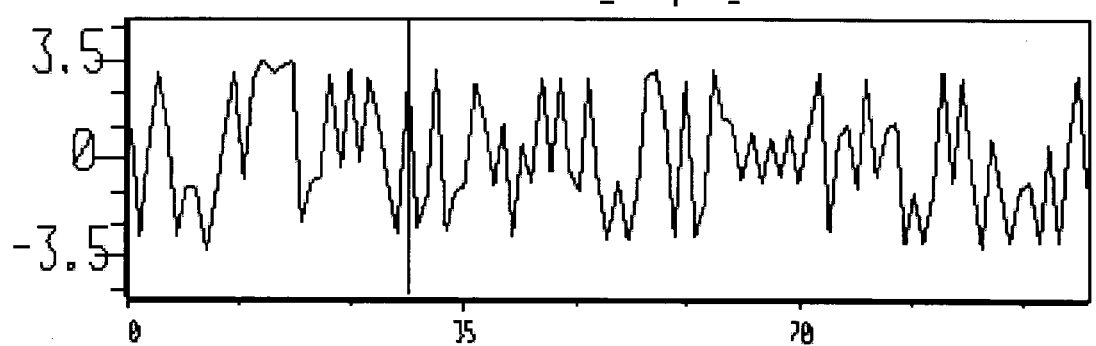
Figure 1C:
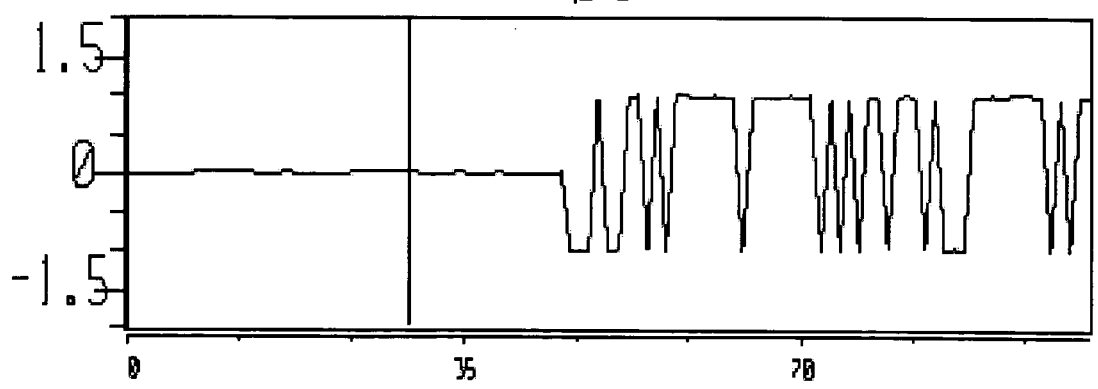
Figure 1D:
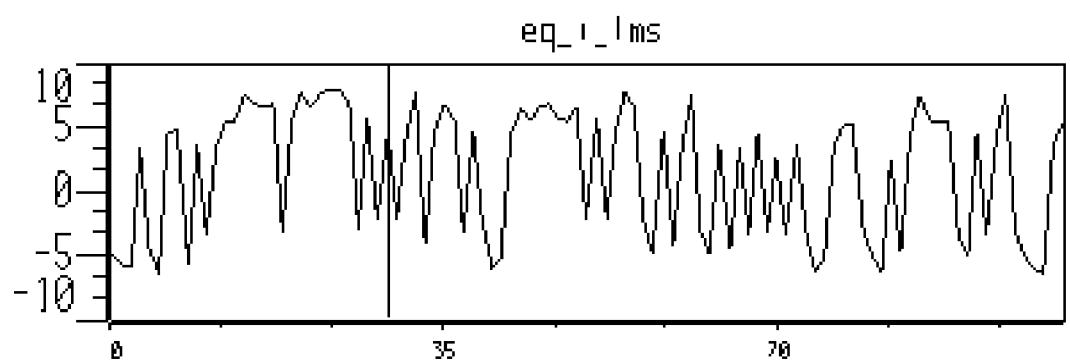
Figure 1E:
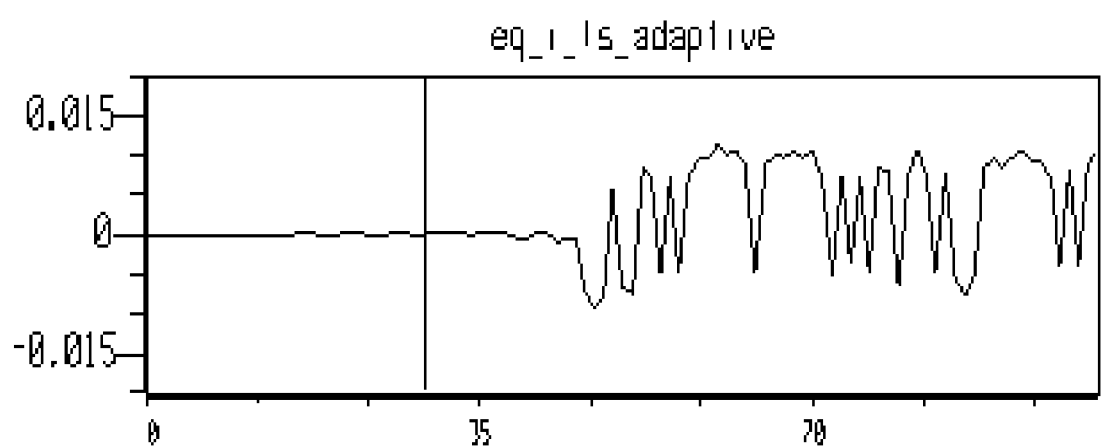

The following discussion presents simulation results that demonstrate the effectiveness of embodiments of the present invention when compared to other methods. FIG. 1A presents an input signal to be transmitted through the multipath channel. Due to multipath interference, after the channel, the input is distorted as shown in FIG. 1B. Using the traditional method, one can recover the signal as shown in the FIG. 1C. Here the signal is perfectly recovered. Note here, in order to apply the methods associated with equation (2), one must modify the channel matrix H to be tall one. Using the LMS method, one can recover the signal as shown in the FIG. 1D. One can clearly observe that the signal recovered by the adaptive LMS algorithm is not as good as that recovered by the matrix inversion method associated with equation (2). FIG. 1E presents the recovered signal using the method provided using the method provided by embodiments of the present invention. The result presented in FIG. 1E is not as good as that by the matrix inversion method associated with equation (2). However, the results presented in FIG. 1E is better than that of the LMS algorithm, because the results of FIG. 1E has smaller ripples. In the above example, there are six multi-path pathways where their power is ordered in a heavily decayed fashion with the power of the first path being 10 dB stronger than the second one.

Figure 2A:
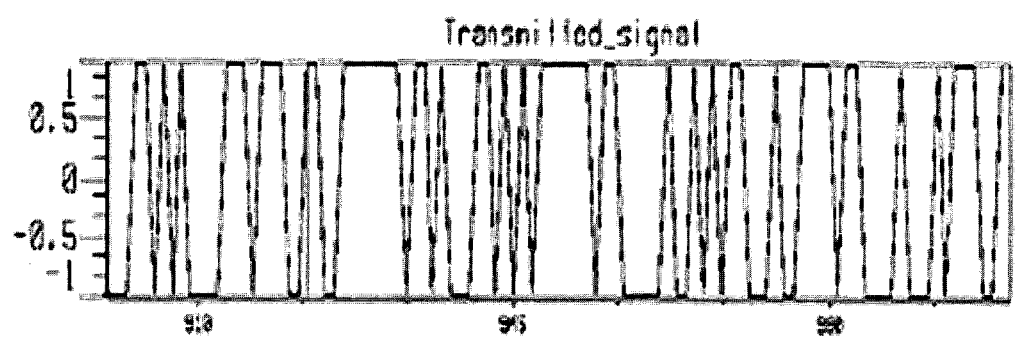
FIGS. 2A through 2F provide performance comparison among three algorithms with a lightly decayed multipath profile and no noise.
Figure 2B:
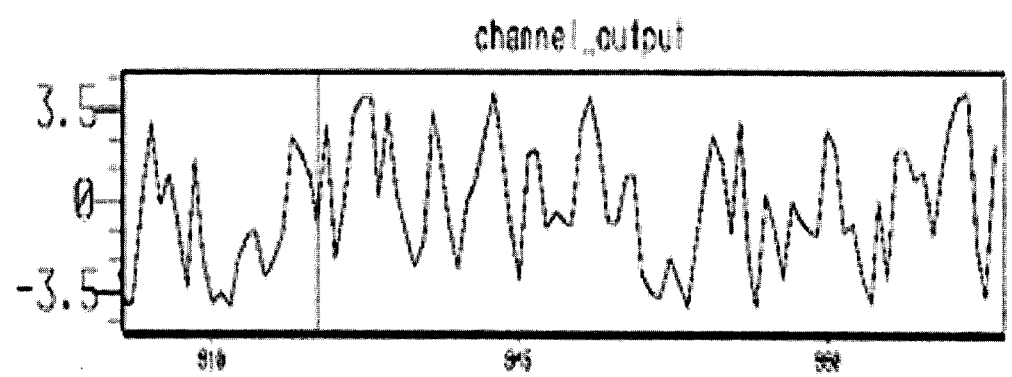
Figure 2C:
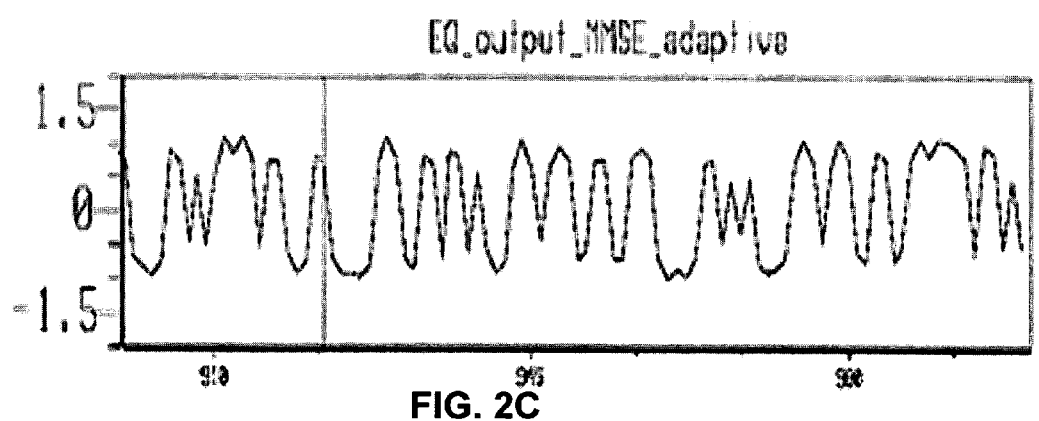
Figure 2D:
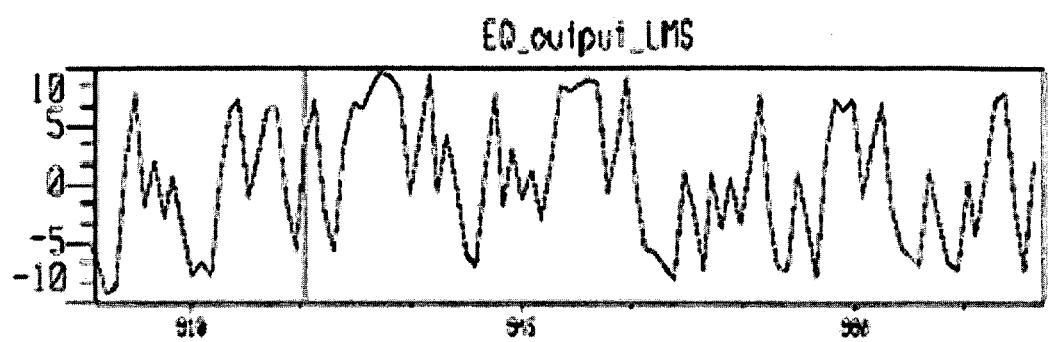
Figure 2E:
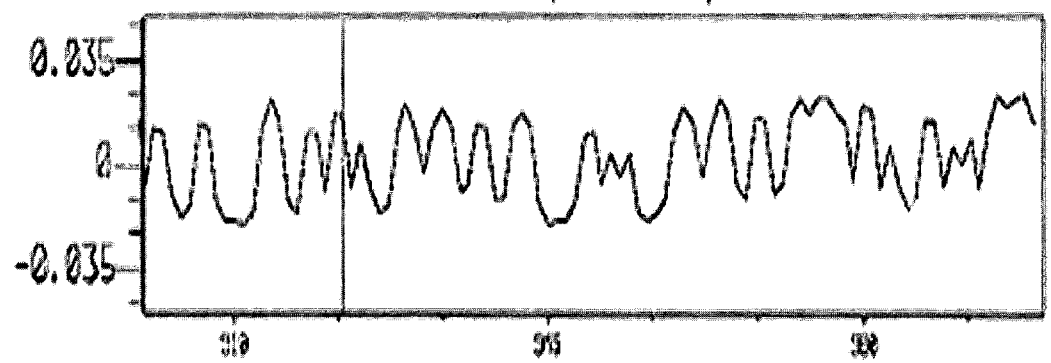
Figure 2F:
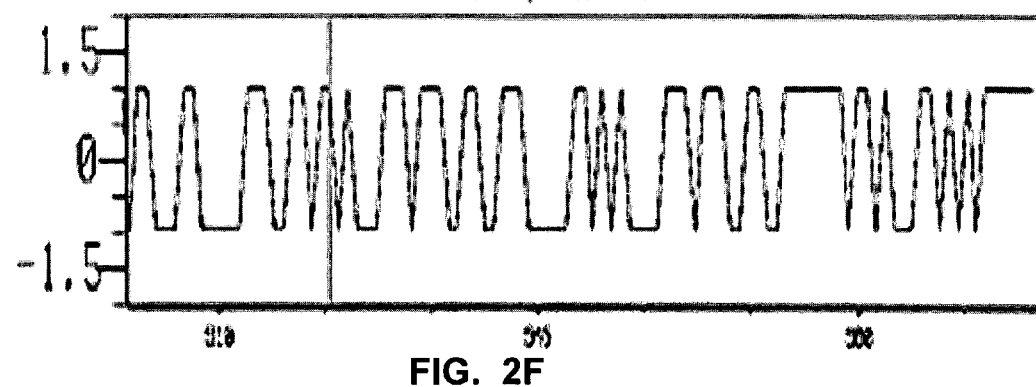

In next set of simulation results, a different channel model was chosen that also had six multi-path pathways. The power of these multi-path pathways did not decay as rapidly as that associated with the prior simulation. Here, the first pathway was only 3 dB stronger than the second pathway. FIG. 2A presents an ideal transmitted signal. FIG. 2B represents the distortion associated with the channel. We can see they are totally different. FIG. 2C presents the recovered signal using the method provided using the method provided by embodiments of the present invention under the criterion of MMSE. Using the LMS method, one can recover the signal as shown in the FIG. 2D. Again, one will clearly observe that the quality of the recovered signal is much poorer than that obtained when applying the methods provided by embodiments of the present invention. FIG. 2E presents the recovered signal using another embodiments of the present invention but in this simulation the criterion of MVE, recall that here we have to modify the H to be a tall one thereby introducing some error which results in a performance not as good as that of MMSE estimator shown on the FIG. 2D. FIG. 2F presents the recovered signal using DMI. The signal is perfectly recovered in this case since the channel H in both examples are never change.

Figure 3:
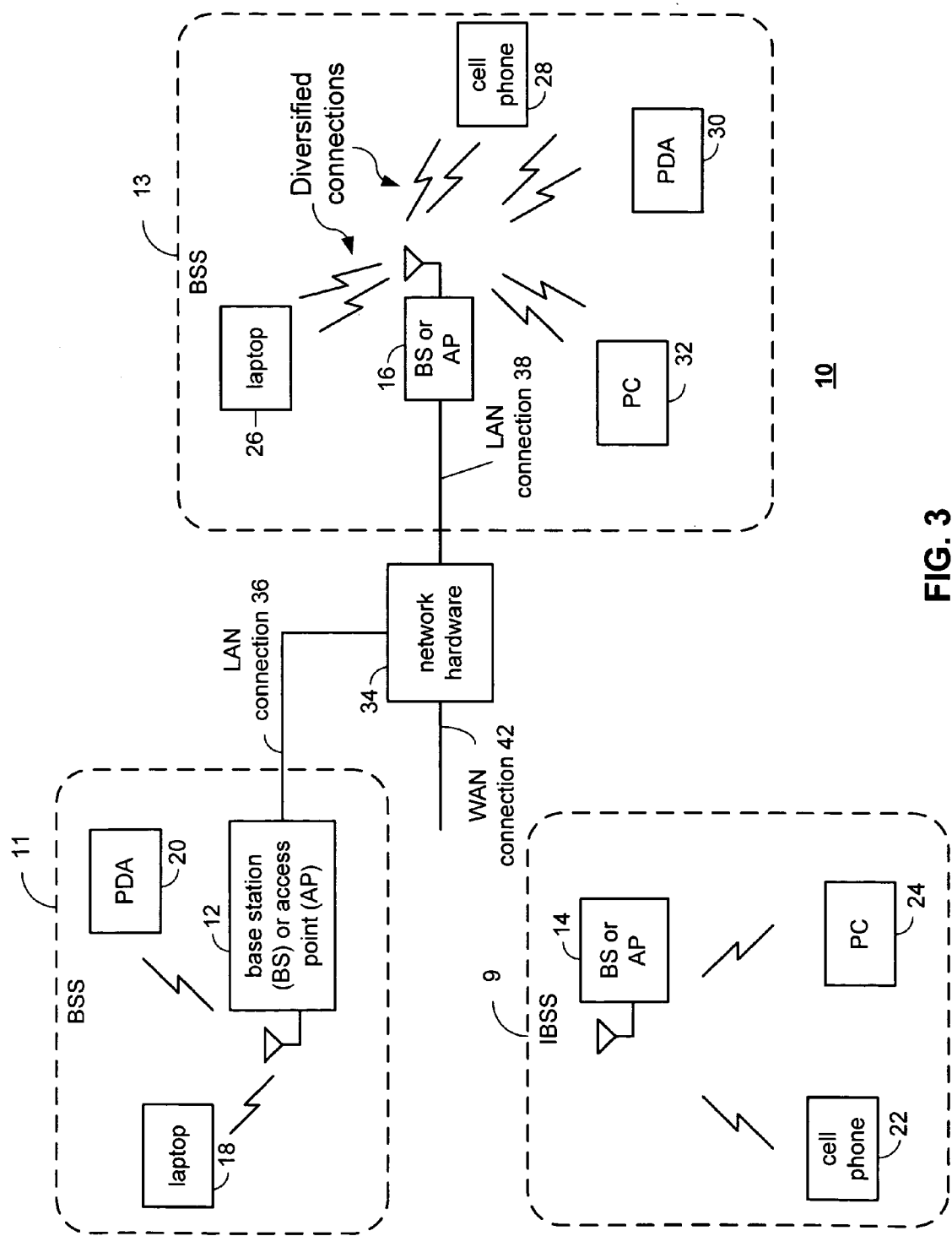
FIG. 3 is a schematic block diagram illustrating a communication system supported by embodiments of the present invention.

FIG. 3 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. Each of these devices may use diversified connections with to communicate with associated base stations and access points. The details of one typical wireless communication devices will be described in greater detail with reference to FIG. 4.

The base stations or access points 12-16 are operably coupled to the network hardware 34 via local area network connections 36, 38 and 40. The network hardware 34, which may be a router, switch, bridge, modem, system controller, et cetera, provides a wide area network connection 42 for the communication system 10. Each of the base stations or access points 12-16 has an associated antenna or antenna array to communicate with the wireless communication devices in its area. These communications may be subject to multipath fading. Methods of addressing multipath fading may include those discussed in further detail with reference to the previous discussion and FIGS. 1A-1E and 2A-2F. The methods presented to address multipath fading within this discussion may be applied to both wireless and wire-line communications. These methods apply to combining situation whenever the diversity replicas exist. Furthermore, these methods do not require that these diversity replicas/branches necessarily come from multipath communications. These methods are applicable to single path with retransmissions or multiple receiving antennas, or other like situations known to those having skill in the art.

Typically, the wireless communication devices register with a particular base station or access point 12-14 to receive services from the communication system 10. For direct connections (i.e., point-to-point communications), wireless communication devices communicate directly via an allocated channel.

Base stations are often used for cellular telephone systems and like-type systems, while access points are used for inhome or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Furthermore, both direct and indirect communications may experience multipath fading. multipath fading is the deflection of a wireless communications signals off obstacles that can cause interference during reception. Multipath fading occurs when a wireless communications signal is received by an antenna and later the same signal is received again, reflected from an obstacle. Under certain conditions, two or more of the signals can interfere with each other and create "fading" (a loss of signal) in the communications link. As the amount of data contained within wireless communications increase and the power of the transmitted signal is reduced, the techniques chosen to combat the multipath fading can vary. The diversity combining scheme selected to address this problem can be selected as the communication system components are being designed.

Figure 4:
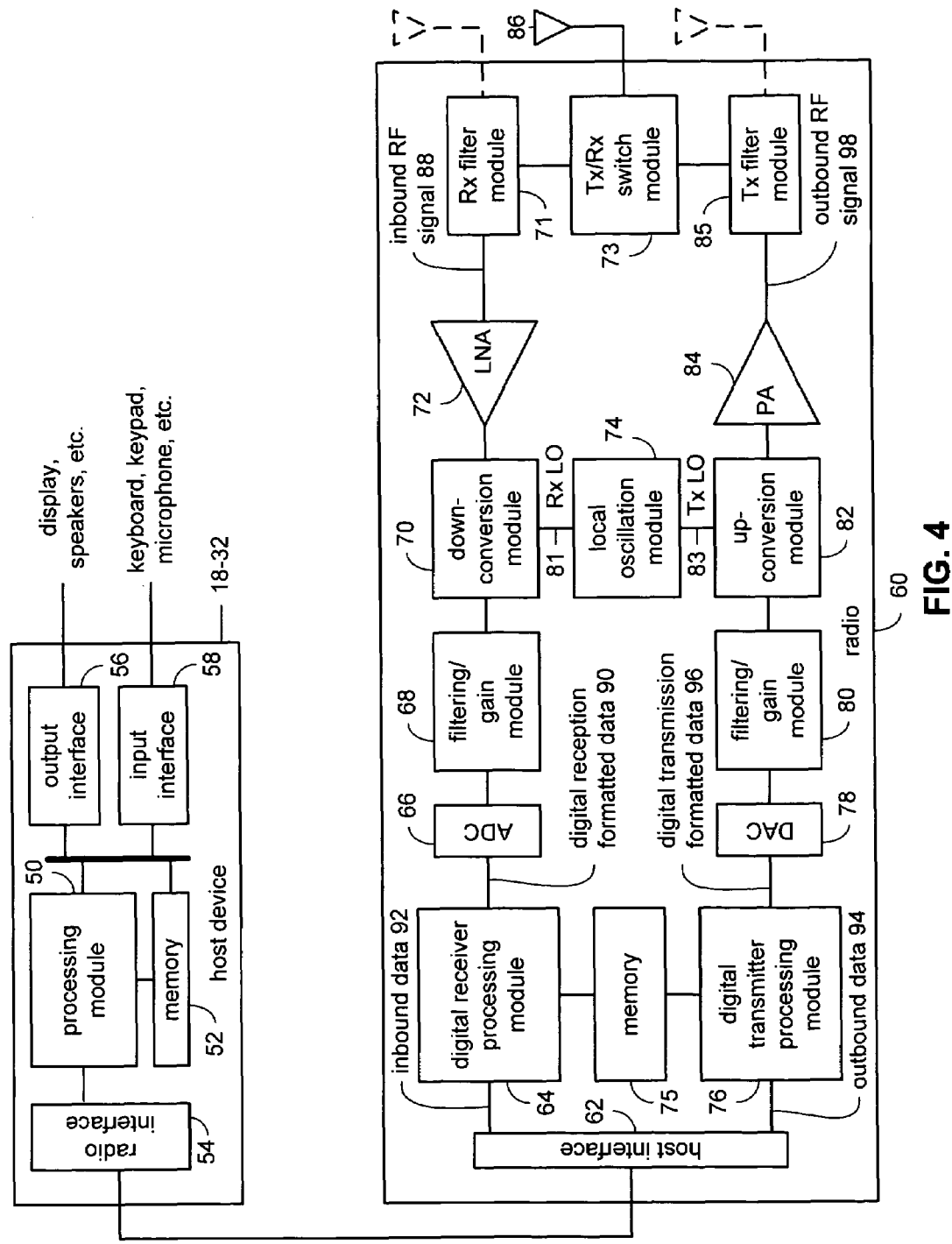
FIG. 4 is a schematic block diagram illustrating a wireless communication device supported by embodiments of the present invention.

FIG. 4 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. Space and time diversity may be associated with the communications received by these wireless communication devices. Received signals, at antenna 86 may be separated in time due to retransmission or space due to varied propagation paths.

This type of diversity is addressed by diversity combining schemes such as those provided by MRC or SC. Since MRC involves more complexity when compared to SC and utilizes all diversity branches, MRC may result in better performance when compared with SC. This improved performance derives from an SNR gain that MRC provides over SC. Knowing this gain may help assess whole system performance and allow system designers to design systems that can trade-off between complexity (or cost) and quality. The SNR gap between the MRC and SC has often been approximated as $10 \log_{10} L$. The present invention teaches that this SNR gap is more accurately expressed by the expression $10 \log_{10} L!/L$. This corrects for many previously approximated inaccuracies when L is not large.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute receiver functions and transmitter functions, respectively. The receiver functions include, but are not limited to, diversity techniques, intermediate frequency to baseband conversion, demodulation, constellation demapping, decoding, and/or descrambling. The transmitter functions include, but are not limited to, scrambling, encoding, constellation mapping, modulation, and/or digital baseband to IF conversion. The receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

Figure 5:
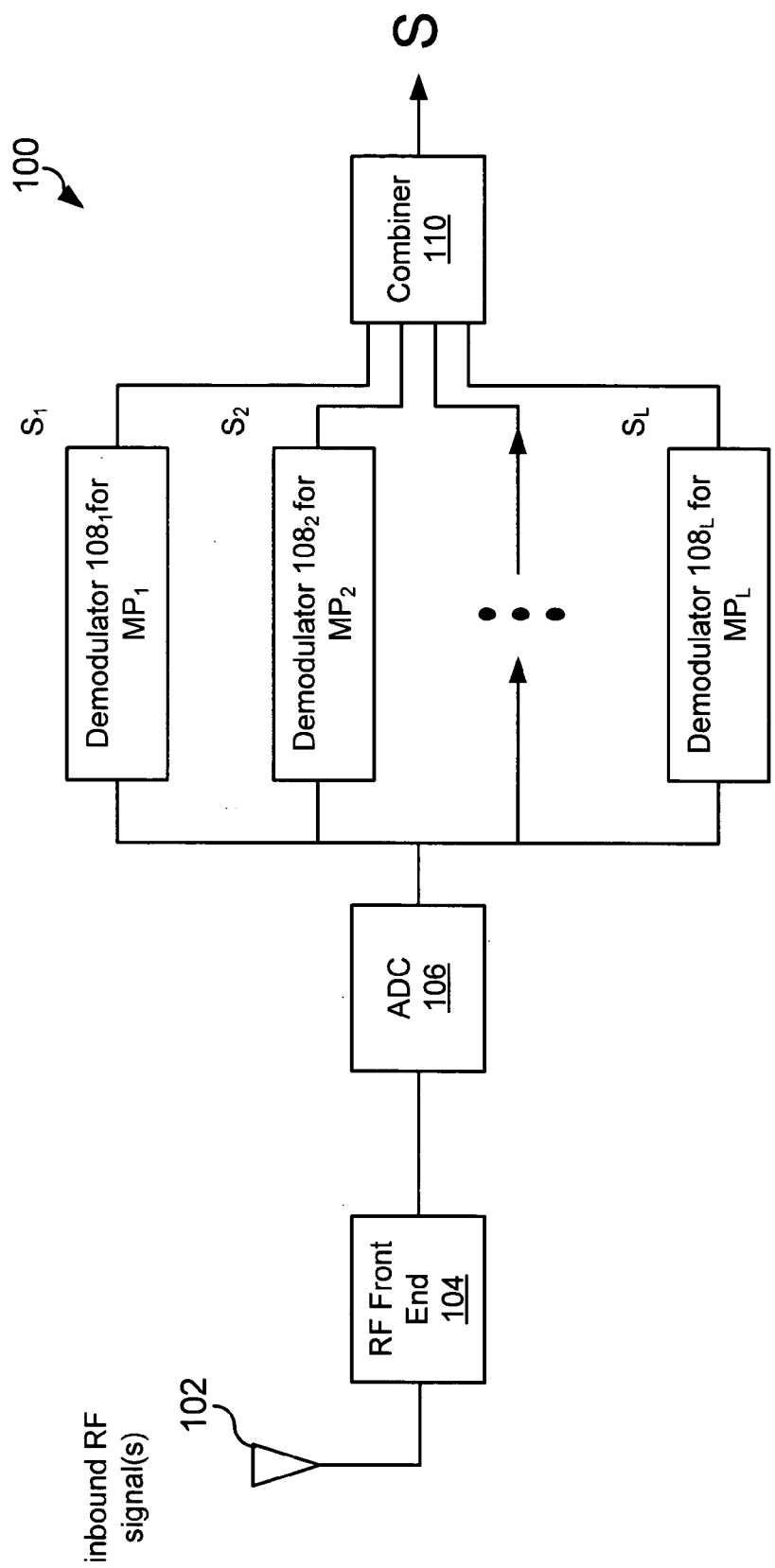
FIG. 5 is a schematic block diagram illustrating one application of diversity combining within a RAKE receiver.

As one of average skill in the art will appreciate, the wireless communication device of FIG. 5 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

FIG. 5 is a schematic block diagram illustrating one application of diversity combining within a RAKE receiver. Within RAKE receiver 100 RF signals are received via an antenna 102 and processed using receiver(s) 104. The received signals may then be converted to digital signals with ADC 106. RAKE receiver 100 may be employed within a CDMA communication system where diversity combining plays a critical part. Although RAKE receiver 100 is discussed with respect to wireless communications. Embodiments of the present invention may be applicable to any scenario where multipath fading combining is utilized. This may occur in both wireless and wireline communications and it may deal with combining situations where replicas of the incoming signal are received with multiple antennas or retransmissions or signals received in singlepath or multipath environments. Additionally, other scenarios known to those skilled in the art may exist where these techniques may be applied.

In a typical multipath scenario, Signal $S_1$ is processed by a demodulator $108_1$ for the particular multipath pathway. Similarly, signals $S_2$ through $S_L$ are processed by demodulator(s) $108_2$ through $108_L$. Combiner 110 may use a combination of logic or arithmetic functions to select and combine these signals to produce output signal S that has both diversity gain and SNR gain. Typically, signal $S_1$ provides a better approximation of signal S than any of the other signals $S_2$ through $S_L$. However, combining these signals properly can result in improved SNR and receiver performance.

Figure 6:
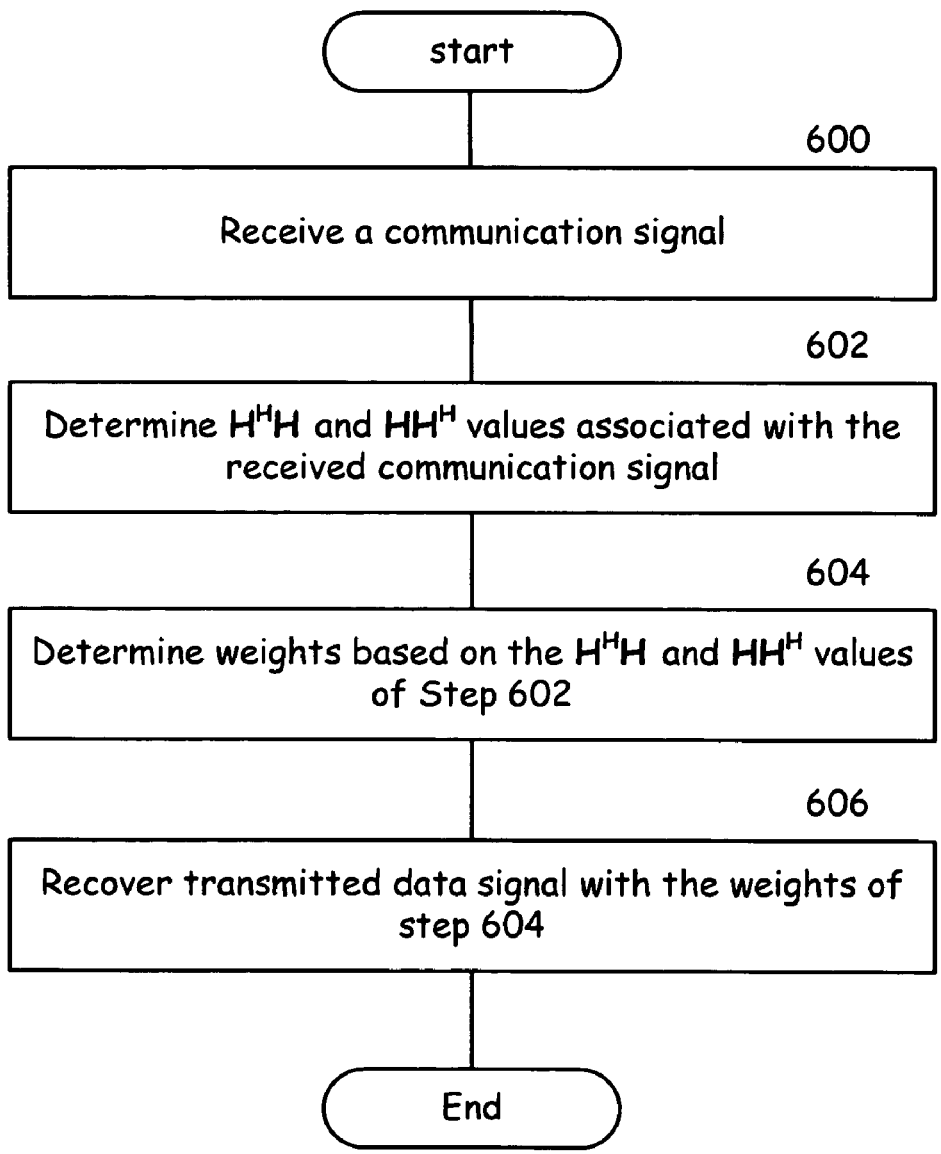
FIG. 6 provides a logic flow diagram that provides a method to perform an adaptive unbiased least square (LS) algorithm operable to mitigate interference for CDMA down link and other like applications in accordance with an embodiment of the present invention.

FIG. 6 provides a logic flow diagram that provides a method to perform an adaptive unbiased least square (LS) algorithm operable to mitigate interference for CDMA down link and other like applications in accordance with an embodiment of the present invention. This method may be used to process a received multipath wireless communication in order to recover a transmitted data signal without performing a direct matrix inversion (DMI). In step 600, the multipath wireless communication is received. Then in step 602 $H^H H$ and $HH^H$ values associated with the multipath wireless communication are determined as described previously. Weights based on $H^H H$ and $HH^H$ associated with the received data signal may then be determined in step 604. Step 606 applies the results of step 602 and 604 to the received multipath wireless communication to recover the transmitted data signal from the received multipath wireless communication.

These wireless communications may conform to an otherwise wireless communication standard or variant such as Code Division Multiple Access (CDMA), Global System for Mobile Communications (GSM), Time Division Multiple Access (TDMA), and Orthogonal Frequency Division Multiplexing (OFDM), and other like communication standards known to those having skill in the art.

In summary, the present invention provides a method to process a received multipath wireless communication in order to recover a transmitted data signal without performing a direct matrix inversion (DMI). First, the multipath wireless communication is received. Then $H^H H$ and $HH^H$ values associated with the multipath wireless communication are determined. Weights based on $H^H H$ and $HH^H$ associated with the received data signal may then be determined and used to recover the transmitted data signal from the received multipath wireless communication.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method to determine weights used to recover a transmitted data signal subject to inter-symbol interference without performing a direct matrix inversion, the method comprising:

receiving a data signal subject to inter-symbol interference;

determining $H^H H$ and $HH^H$ associated with the received data signal, wherein H is the channel matrix;

determining the weights based on $H^H H$ and $HH^H$ associated with the received data signal, wherein the weights are equalizer coefficients; and recovering the transmitted data signal from the received data signal using the determined weights.

2. The method of claim 1, wherein a new H is available every chip.

3. The method of claim 1, wherein the received data signal is within a CDMA downlink.

4. The method of claim 1, wherein the received data signal is a multipath signal.

5. The method of claim 4, wherein the transmitted data signal is a cellular communication signal.

6. The method of claim 1, wherein the weights are determined with the following expression:

$$w^{(i)} = w^{(i-1)}(I - \mu HH^H - \mu\sigma^2 I) + \mu h^H$$

where $w^{(i)}$ is the ith iteration weight which is a row vector, h is the column vector in H which carries a symbol to be recovered within the transmitted data signal.

7. The method of claim 1, wherein the weights recover the transmitted data signal as an MVE.

8. The method of claim 1, wherein y=Hx, and where the transmitted data signal is denoted by x and received data signal is denoted by y, and H is a channel matrix.

9. The method of claim 1, wherein the transmitted data signal conforms to a wireless communication standard or variant of the wireless communication standard selected from the group consisting of:
Code Division Multiple Access (CDMA);
Global System for Mobile communications (GSM);
Time Division Multiple Access (TDMA); and
Orthogonal Frequency Division Multiplexing (OFDM).

10. A receiver operable to recover a transmitted data signal subject to inter-symbol interference without performing a direct matrix inversion, the receiver comprising:
an antenna element operable to receive a data signal subject to inter-symbol interference;
a processing module operable to:
determine $H^H H$ and $HH^H$ associated with the received data signal;
determine the weights based on $H^H H$ and $HH^H$ associated with the received data signal; and
recover the transmitted data signal from the received data signal using the determined weights.

11. The receiver of claim 10, wherein a new H is available every chip.

12. The receiver of claim 10, wherein the received data signal is within a CDMA downlink.

13. The receiver of claim 10, wherein the received data signal is a multipath signal.

14. The receiver of claim 13, wherein the transmitted data signal is a cellular communication signal.

15. The receiver of claim 10, wherein the weights are determined with the following expression:

$$w^{(i)} = w^{(i-1)}(I - \mu HH^H - \mu\sigma^2 I) + \mu h^H$$

where $w^{(i)}$ is the $i^{th}$ iteration weight which is a row vector, h is the column vector in H which carries a symbol to be recovered within the transmitted data signal.

16. The receiver of claim 10, wherein the weights recover the transmitted data signal as an MVE.

17. The receiver of claim 10, wherein y=Hx, and where the transmitted data signal is denoted by x and received data signal is denoted by y, and H is a channel matrix.

18. The receiver of claim 10, wherein the transmitted data signal conforms to a wireless communication standard or variant of the wireless communication standard selected from the group consisting of:
Code Division Multiple Access (CDMA);
Global System for Mobile communications (GSM);
Time Division Multiple Access (TDMA); and
Orthogonal Frequency Division Multiplexing (OFDM).

19. A method of processing a multipath wireless communication, comprising:
receiving the multipath wireless communication, wherein a number of diversity branches, L, are associated with the received multipath wireless communication;
determining $H^H H$ and $HH^H$ associated with the multipath wireless communication;
determining weights based on $H^H H$ and $HH^H$ associated with the received data signal; and
recovering the transmitted data signal from the received data signal using the determined weights.

20. The method of claim 19, wherein a new H is available every chip.

21. The method of claim 19, wherein the multipath wireless communication is within a CDMA downlink.

22. The method of claim 19, wherein the weights are determined with the following expression:

$$w^{(i)} = w^{(i-1)}(I - \mu HH^H - \mu\sigma^2 I) + \mu h^H$$

where $w^{(i)}$ is the $i^{th}$ iteration weight which is a row vector, h is the column vector in H which carries a symbol to be recovered within the transmitted data signal.

23. The method of claim 19, wherein the weights recover the transmitted data signal as an MVE.

24. The method of claim 19, wherein y=Hx, and where the transmitted data signal is denoted by x and received data signal is denoted by y, and H is a channel matrix.

25. The method of claim 19, wherein the transmitted data signal conforms to a wireless communication standard or variant of the wireless communication standard selected from the group consisting of:
Code Division Multiple Access (CDMA);
Global System for Mobile communications (GSM);
Time Division Multiple Access (TDMA); and
Orthogonal Frequency Division Multiplexing (OFDM).

* * * * *